Feb. 21, 1967  J. M. GRATSCH  3,304,607
CUTTING MACHINE
Filed Aug. 16, 1965  2 Sheets-Sheet 1
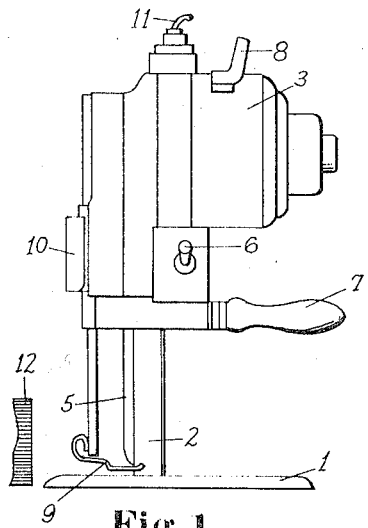
Fig. 1
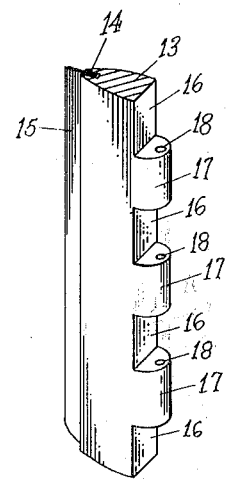
Fig. 2
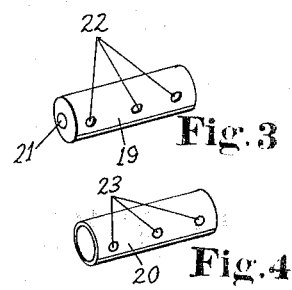
Fig. 3
Fig. 4
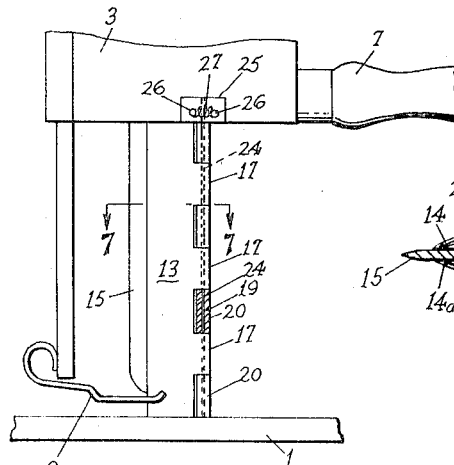
Fig. 5
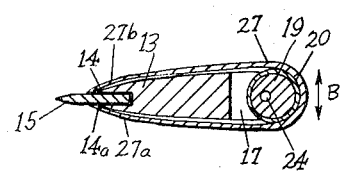
Fig. 7
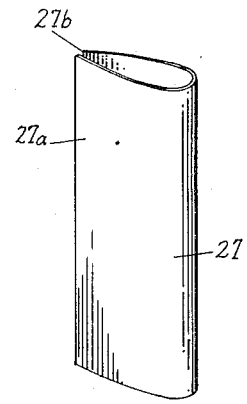
Fig. 6
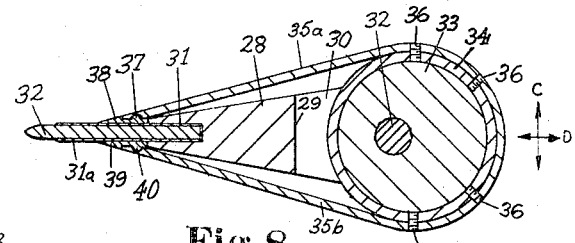
Fig. 8
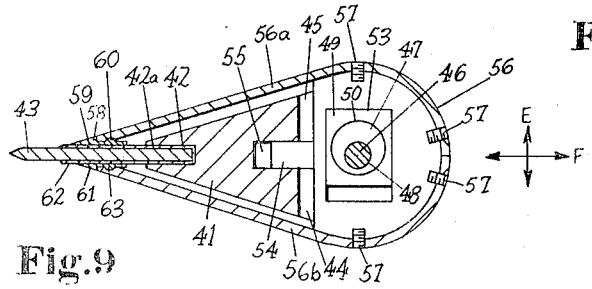
Fig. 9
INVENTOR
JACK M. GRATSCH,
BY Yungblut, Melville, Strasser and Foster
ATTORNEYS Feb. 21, 1967  J. M. GRATSCH  3,304,607
CUTTING MACHINE
Filed Aug. 16, 1965  2 Sheets-Sheet 2
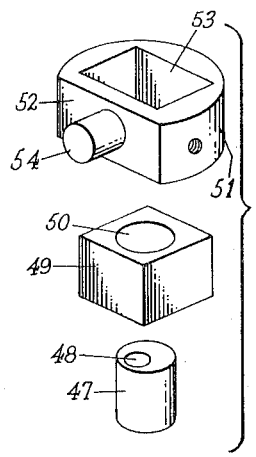
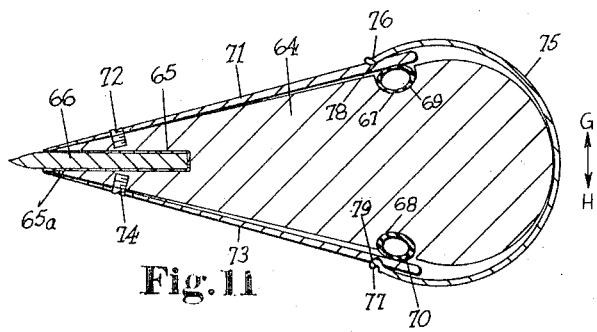
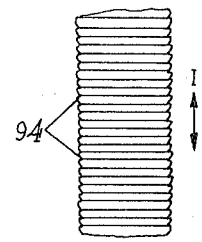
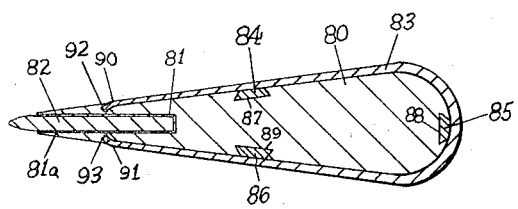
INVENTOR
JACK M. GRATSCH,
BY *Yungblut, Melville, Strasser and Foster*
ATTORNEYS

United States Patent Office 3,304,607
Patented Feb. 21, 1967

3,304,607
CUTTING MACHINE
Jack M. Gratsch, 6720 Britton Ave.,
Cincinnati, Ohio 45227
Filed Aug. 16, 1965, Ser. No. 479,838
9 Claims. (Cl. 30—273)

The invention relates to improvements in cutting machines, and more particularly to improvements in cutting machines of the type adapted to cut through a plurality of layers of sheet material. While machines of this nature may be used for cutting any suitable pliable sheet material such as plastics or the like, for purposes of an exemplary showing the present invention will be described in connection with a fabric cutting machine as used in garment shops for cutting multiple layers of cloth.

In the usual practice in the garment industry, multiple layers of cloth or the like are arranged in superposed position and are cut to a given pattern simultaneously. In general, a cutting machine for this purpose comprises a base which may be fitted with rollers. To this base is affixed a vertically oriented standard. This standard supports a housing for an electric motor. The electric motor powers a vertically oriented reciprocating blade, which is located at the front edge of and is supported by the standard.

The number of layers of cloth which may be cut simultaneously is limited largely by the pressure required to shove the cutting machine through the stack. As the number of layers increase, the amount of pressure required to shove the blade and its supporting standard through the stack of material increases, and it becomes more difficult to maintain the cutting machine in a vertical position, and more difficult to make an accurate cut. These difficulties are due in large measure to the resistance imparted to the blade and the standard by the surrounding material.

It has been discovered that if the standard is provided with a sheath, and if motion is imparted to the sheath with respect to the standard, a greater number of layers of material can be cut simultaneously, with greater ease and accuracy.

It is therefore an object of the present invention to provide a cutting machine of the type described with which a greater number of layers of material may be cut simultaneously than hitherto possible.

It is an object of the present invention to provide such a cutting machine which is easier to use and to control.

It is an object of the present invention to provide such a cutting machine which is easy and inexpensive to manufacture.

These and other objects of the invention which will be set forth hereinafter or will be apparent to one skilled in the art upon reading these specifications, are accomplished by that construction and arrangement of parts of which certain exemplary embodiments will now be described. Reference is made to the accompanying drawings wherein:

FIGURE 1 is a side elevational view of a cutting machine of the type described.

FIGURE 2 is a perspective view of a standard and blade of the type used in the cutting machine of FIGURE 1, the standard having been modified in accordance with the present invention.

FIGURE 3 is a perspective view of a cylindrical cam element.

FIGURE 4 is a perspective view of a sleeve element of the present invention.

FIGURE 5 is a fragmentary side elevation of a machine of the type illustrated in FIGURE 1 showing the modified form of standard illustrated in FIGURE 2 including the cam elements and sleeve elements illustrated in FIGURES 3 and 4 respectively.

FIGURE 6 is a perspective view of a sheath.

FIGURE 7 is a cross-sectional view taken along the section line 7—7 of FIGURE 5 and including a sheath as illustrated in FIGURE 6.

FIGURE 8 is a cross-sectional view similar to FIGURE 7 but illustrating another embodiment of the present invention.

FIGURE 9 is a cross-sectional view similar to FIGURE 7, but illustrating yet another embodiment of the present invention.

FIGURE 10 is an exploded view showing the guide, slide block and cam of the embodiment of FIGURE 9.

FIGURE 11 is a cross-sectional view through the standard and blade of a cutting machine of the type described, showing another embodiment of the present invention.

FIGURE 12 is a cross-sectional view through the blade and standard of a cutting machine of the type described, illustrating yet another embodiment of the present invention.

FIGURE 13 is a fragmentary elevational view of the sheath shown in FIGURE 6.

FIGURE 1 illustrates a typical cutting machine of the type to which this invention relates. The machine comprises a base 1 which may be provided with rollers (not shown). Affixed to the base is a vertically oriented standard 2 which supports a housing 3 for an electric motor. The front edge of the standard 2 is notched to receive the rear edge of a vertically oriented knife blade 5. The blade 5 is supported by the standard 2, and is adapted to reciprocate vertically. The reciprocating motion is imparted to the blade by means of an electric motor within the housing 3, through suitable geared means (not shown) which are well known in the art and do not constitute a part of this invention. The cutting machine may also have an on-off switch 6, an operating handle 7 and a carrying handle 8. The machine may be provided with other elements well known in the art, as for example a presser foot 9 adapted to bear on the upper surface of the pile of cloth, and blade sharpening means generally indicated at 10.

Briefly, in the operation of the cutting machine, the electric motor within the housing 3 is connected to a source of current by means of an electric cord (a portion of which is indicated at 11). The machine is located on a planar surface adjacent a stack of material (fragmentarily indicated at 12). The presser foot 9 is appropriately adjusted, and the machine is turned on by means of the switch 6. The operator, by using the handle 7, simply shoves the blade 5 and standard 2 through the pile of material 12, following an appropriate pattern. The base member 1 is sufficiently low in profile to easily slide beneath the pile of cloth. As stated above, the major factor limiting the number of layers of material which may be cut simultaneously is the resistance of the material to the passage of the blade and the standard.

FIGURE 2 illustrates a standard 13 of the type shown at 2 in FIGURE 1, but modified in accordance with the teachings of the present invention. As in FIGURE 1, the standard 13 has a somewhat tear-shaped cross-sectional configuration elongated in the direction of cutting. The forward edge of the standard is provided with a notch 14 for the receipt of the rear edge of a cutting blade 15. A shim of U-shaped cross section may be provided in the notch 14 (as at 14a, FIG. 7) to prevent wearing of the standard 13 by the blade 15. The rear edge of the standard, however, has been notched as at 16 to provide a plurality of rearwardly extending lugs 17. The lugs 17 are provided with vertical, coaxial perforations indicated at 18. The purpose of these perforations 18 will be described more fully hereinafter.

FIGURES 3 and 4 illustrate respectively a cylindrical cam means 19 and a hollow cylindrical cam sleeve 20. The cylindrical cam 19 is provided with an off-center longitudinal perforation 21. It is also provided with a plurality of threaded perforations 22 for the receipt of set screws, by means of which the cam member 19 may be non-rotatively affixed to a shaft extending through the perforation 21.

The cam sleeve 20 has an internal diameter such that it may be placed over a cam member 19 and rotate freely about it. The sleeve 20 is prvoided with a plurality of perforations 23 matching the prveorations 22 in the cam, whereby access may be had to set screws located in the cam perforations 22. The cam 19 and the cam sleeve 20 may be of substantially equal length, and their length may be substantially equal to the distance between adjacent lugs 17 on the standard 13.

FIGURE 5 is a partial elevational view of a cutting machine of the type shown in FIGURE 1, having a standard of the type shown in FIGURE 2. The standard is provided with a vertically oriented shaft 24 extending through the perforations 18 in the lugs 17. In each notch 16 in the standard 13, a cam and cam sleeve assembly is affixed to the shaft 24. One of these assemblies, for purposes of clarity, is illustrated in cross-section.

The upper and lower ends of the shaft 24 are mounted in appropriate bearings (not shown) in the housing 3 and the base 1. The shaft 24 may be caused to rotate by suitable mechanical connection (not shown) to the shaft of the electric motor within the housing 3, or it may be powered by suitable mechanical connection to an auxiliary electrical motor (not shown) mounted on the casing 3. When an auxiliary electric motor is used, the casing 3 may be provided with an opening 25. A chain 26, driven by the auxiliary electric motor may pass through the opening 25 and engage a sprocket 27 on the shaft 24. It will be understood by one skilled in the art, that when the shaft 24 is caused to rotate, the cams 19, non-rotatively affixed to it, will also rotate.

FIGURE 6 is a perspective view of a sheath 27 adapted to surround the standard 13 and the cam and cam sleeve assemblies. The sheath 27 may be made of any suitable resilient material such as thin spring-steel or the like.

FIGURE 7 is a cross-sectional view taken along the section line 7—7 of FIGURE 5, and also illustrates the placement of the sheath 27. It will be noted from this figure, that the cross-sectional configuration of the sheath 27 is such as to substantially conform to the exterior configuration of the standard 13. The sheath 27 does not cover the front edge of the standard from which the blade 15 extends. It will also be noted that the sheath is of such cross-sectional length as to accommodate the cam 19 and cam sleeve 20, when the cam is in its most extended position to the rear of the standard 13. In FIGURE 7, the cam and cam sleeve assembly is illustrated in this rearwardmost position. The forwardmost edges 28a and 27b of the sheath 27 are affixed to the standard 13 by any suitable means such as soldering, welding, set-screws or the like.

When a cutting machine of the type shown in FIGURE 1 is provided with the standard, cam and sheath assembly of FIGURE 7, the operation of the machine will be substantially the same as described with respect to FIGURE 1. However, it will be obvious to one skilled in the art, that as the shaft 24 is caused to rotate, it will, in turn, cause the cams 19 to rotate. The action of the cams 19 will impart to the sheath 27 a side-to-side or flexing motion as indicated by the double-headed arrow B. The cam sleeve will protect the sheath from erosive wear. It has been discovered that the rapid flexing from side-to-side of the sheath 27 materially reduces the resistance afforded the blade and the standard by the stack of cloth layers during the cutting operation. This not only results in an easier and more accurate cut, but enables a number of layers of material to be increased.

FIGURE 8 illustrates another embodiment of the present invention. FIGURE 8 is a cross-sectional view through a standard 28 similar to the standard 13 illustrated in FIGURE 2. Again the rear edge of the standard 28 is provided with a plurality of notches (one of which is shown at 29) forming a plurality of rearwardly extending lugs (one of which is shown at 30). The front edge of the standard 28 has a notch 31 and a shim 31a to receive the rear edge of a blade 32. The standard 28 supports a vertically oriented shaft 32, having a plurality of cam members 33 provided with cam sleeves 34. The shaft 32, the cam members 33 and cam sleeves 34 are similar to the shaft, cam and cam sleeve elements illustrated in FIGURES 3 through 5.

In the embodiment of FIGURE 8, the sheath is made up of two parts 35a and 35b which are mirror images of each other. The sheath parts 35a and 35b are non-rotatively affixed to each of the cam sleeves 34 by any suitable means such as set screws indicated at 36. The front edge of the sheath part 35a is affixed by any suitable means to an elongated slide bar 38. For purposes of an exemplary showing, the slide bar 38 is shown affixed to the front edge of sheath part 35a by a tongue and groove arrangement indicated at 37. The slide bar extends the full length of the front edge of the sheath part 35a and slidably engages the side of the blade 32, being held in place by the configuration of the sheath part 35a itself. The sheath part 35b is provided with a similar slide bar 39 and is affixed thereto by a tongue and groove arrangement 40.

When a cutting machine of the type shown in FIGURE 1 is provided with the structure shown in FIGURE 8, the operation of the machine will be similar to that described with respect to FIGURE 1. However, one skilled in the art will note that by virtue of the fact that the sheath parts 35a and 35b are non-rotatively affixed to the cam sleeves 34, a flexing motion will be imparted to the sheath parts having not only a side-to-side component as indicated by the double headed arrow C, but also a forward and rearward component as indicated by the double headed arrow D.

A third embodiment of the present invention is illustrated in FIGURE 10, which is a horizontal cross-sectional view through a standard 41. The standard 41 has a lotch 42 in its forward edge and a shim 42a for the receipt of a blade 43. The rear edge of the standard 41 is provided with a plurality of notches, one of which is shown at 44, forming a plurality of rearwardly extending lugs, one of which is shown at 45. The lugs 45 are provided with vertically oriented coaxial perforations similar to the perforations 18 in the embodiment shown in FIGURE 2. These perforations are adapted to receive a vertically oriented shaft 46.

In each of the notches 44 and between adjacent lugs 45 there is located a camming assembly most clearly shown in FIGURE 10. The camming assembly comprises a cylindrical cam 47 provided with an off-center perforation 48. The perforation 48 is adapted to receive the shaft 46, and the cam 47 is non-rotatively affixed to the shaft 46 by any suitable means (not shown) such as set screws or the like. A slide block is illustrated at 49 and is provided with a central perforation 50 adapted to receive the cam 47. The perforation 50 is of such diameter that the cam 47 may rotate freely therein. A guide means is illustrated at 51. The exterior vertical surface of the guide 51 is provided with a flat area 52. The remainder of the vertical surface of the guide 51 may be of any suitable configuration and for purposes of illustration is shown as arcuate. Referring to FIGURES 9 and 10, the guide 51 is provided with a rectangular perforation 53. It will be noted from FIGURE 9 that along its axis parallel to the cutting direction, the width of the perforation 53 is substantially the same as the width of the slide block 49. The length of the perforation 53 along its axis perpendicular to the cutting direction is longer than the length of the slide block 49.

When in assembly, as shown in FIGURE 9, the cam 47 is non-rotatively affixed to the shaft 46. The cam 47 is located within the perforation 50 of the slide block 49, and the slide block itself is located within the perforation 53 of the guide 51. The flat area 52 of the guide 51 is provided with an extension 54 adapted to be slidably received in a bore 55 in the standard 41. The extension 54 acts as a guide for the can assembly when motion is imparted to it, as will be described more fully hereinafter.

The embodiment of FIGURE 9 is provided with a sheath 56 made up of two parts 56a and 56b. The sheath parts 56a and 56b are affixed to each of the guides 51 located in each of the notches 44 in the standard 41. The sheath parts may be affixed to the guides in any suitable manner such as by set screws 57 (four of which are shown in FIG. 9). The sheath part 56a is provided with a slide bar 58 adapted to slide along the surface 59 of the shim 42a. The slide bar 58 is substantially equal in length to the height of the sheath part 56a and may be affixed thereto by any suitable means such as a tongue and groove arrangement 60. The sheath part 56b is provided with a similar slide bar 61 adapted to slide along the surface 62 of the standard, and affixed to the sheath part by a tongue and groove arrangement 63.

Again, the operation of a cutting machine such as that illustrated in FIGURE 1, provided with the assembly of FIGURE 9 will be the same as described above. It will be obvious to one skilled in the art, however, that as the shaft 46 and the attached cams 47 are caused to rotate, motion will be imparted to the slide block 49 having both a side-to-side component as indicated by the double headed arrow E and a forward and rearward component as indicated by the double headed arrow F. By virtue of the configuration of the perforation 53 in the guide 51, it will be apparent that the side-to-side motion of the slide block 49 will not be communicated to the guide 51. However, the forward and rearward component of motion will be communicated to the guide 51. Thus, as the shaft 46 and cams 47 are caused to rotate, a forward and rearward motion (as indicated by double headed arrow F) will be imparted to the plurality of guides 51 and thence to the sheath 56. The forward portion of the sheath 56 will be guided by the slide bars 58 and 61. In this embodiment, the resistance to the passage of the cutting machine through the stack of material will be reduced by virtue of the motion of the sheath 56 along a line parallel to the cutting direction.

Another embodiment of the present invention is illustrated in FIGURE 11. In this embodiment the standard 64 is substantially tear-shaped in cross section, and is provided at its forward edge with a notch 65 and a shim 65a to receive a blade 66. Each side of the standard 64, near the rear end thereof, is provided with an elongated notch, shown at 67 and 68. The notches 67 and 68 run substantially the full length of the standard and are adapted to receive flexible bladder means 69 and 70 respectively.

In this embodiment, the sheath is made up of three parts, side elements 71 and 73, and an end element 75. It will be understood that these elements run the full length of the standard 64. Side element 71 is affixed at its forward edge to the standard 64 by any suitable means such as set screws (one of which is shown at 72). The rear edge of the element 71 overlies the bladder 69. The side element 73 is similarly affixed at its forward edge to the standard by means of set screws (one of which is shown at 74), and its rear edge overlies the bladder 70.

The end element 75 of the sheath is arcuate in configuration and its ends 76 and 77 are adapted to overlie the rear edges of the side elements 71 and 73. The sheath elements 71, 73 and 75 may be made of any suitable resilient material such as spring-steel or the like. The end element 75 will serve to urge the rear edges of the sheath elements 71 and 73 against the bladders 69 and 70 respectively. The end element 75 may be affixed to the standard 64 by set screws or the like, or the ends 76 and 77 of the element 75 may engage elongated notches 78 and 79 in the sheath elements 71 and 73 respectively.

It will be understood by one skilled in the art, that if blasts of gas such as air or the like are introduced into the bladders 69 and 70, the sheath elements 71 and 73 will be flexed in the directions of the arrows G and H respectively. The spring-action of the end element 75 will cause the sheath elements 71 and 73 to return to their normal position and deflate the bladders 69 and 70. When the assembly of FIGURE 11 is applied to a cutting machine of the type shown in FIGURE 1, the cutting machine will also be provided with means (not shown) for introducing gas blasts into the bladders. Such means may take any suitable well known form.

If gas blasts are introduced into the bladders 69 and 70 alternately, a side-to-side motion will be imparted to the sheath parts much like the motion of the embodiments of FIGURES 7 and 9. If simultaneous gas blasts are introduced into the bladders 69 and 70, the sheath parts 71 and 73 will move outwardly simultaneously, tending to fluff the material in the stack, thereby reducing its resistance to the passage of the cutting machine.

Another embodiment of the present invention is illustrated in FIGURES 12 and 13. FIGURE 12 is a cross-sectional view through a standard 80 having a notch 81 and a shim 81a for the receipt of a blade 92. In this embodiment, a sheath 93 surrounds all but the forward edge of the standard 80. The sheath 83 is provided with keys 84 through 86 adapted to be slidably received in keyways 87 through 89 respectively in the standard. The forward edges 90 and 91 of the sheath 83 may be turned inwardly and received in longitudinal notches 92 and 93 respectively in the standard 80.

As illustrated in FIGURE 13, the external surface of the sheath 83 may be provided with a plurality of horizontally oriented ribs 94. When the embodiment of FIGURES 12 and 13 is applied to a cutting machine of the type shown in FIGURE 1, means will be provided to impart a vertical reciprocating motion to the sheath 83 with respect to the standard 80 (as indicated by the double headed arrow I, FIGURE 13). The means (not shown) for imparting the vertical reciprocating motion to the sheath 83 may take any well known form. For example, a solenoid may be used, or the sheath 83 may be reciprocated by suitable mechanical connection to the electric motor within the housing 3 or to an auxiliary electric motor. The engagement of the keys 84 through 86 on the sheath, with the keyways 87 through 89 in the standard 80 will insure the proper positioning of the sheath with respect to the standard. In this embodiment, as the cutting machine passes through the stack of material, the layers of material will be fluffed by the ribs 94 of the sheath, thereby reducing the resistance to the passage of the cutting machine through the stack.

Modifications may be made in the present invention without departing from the spirit of it.

The embodiments of the invention in which an exclusive property or privilege is claimed are defined as follows:

1. In a device of the character described, a head, a standard and a base, said standard connecting said head with said base, said standard having a front edge and a rear portion, a vertically reciprocal knife mounted at the front edge of said standard, means in said head for reciprocating said knife, a sheath surrounding said standard excepting for said front edge so that said knife projects beyond said sheath, means for imparting motion to said sheath with respect to said standard.

2. The structure claimed in claim 1 wherein said means for imparting motion to said sheath imparts a mode of motion thereto different from the mode of action of said knife.

3. The structure claimed in claim 1 wherein said motion of said sheath is a vertically reciprocal motion.

4. The structure claimed in claim 2 wherein said mode of motion of said sheath is transverse to said standard.

5. The structure claimed in claim 2 wherein said mode of motion of said sheath has a component of motion extending laterally of said standard.

6. The structure claimed in claim 2 wherein said mode of motion of said sheath is transverse to said standard and along a line perpendicular to a line extending from said front edge to said rear portion of said standard.

7. The structure claimed in claim 2 wherein said mode of motion of said sheath is transverse to said standard and along a line extending from said front edge to said rear portion of said standard.

8. The structure claimed in claim 2 wherein said mode of motion of said sheath is transverse to said standard and has a component of motion along a line perpendicular to a line extending from said front edge to said rear portion of said standard, and a component of motion along said last mentioned line.

9. The structure claimed in claim 3 wherein said sheath has an external surface provided with a plurality of horizontally oriented ribs.

References Cited by the Examiner

UNITED STATES PATENTS

| | | | |
|---|---|---|---|
| 2,305,465 | 12/1942 | Bangser | 30—273 |
| 2,958,355 | 11/1960 | Young | 30—272 X |
| 3,052,981 | 9/1962 | Landes | 30—272 |

WILLIAM FELDMAN, *Primary Examiner.*

J. L. JONES, *Examiner.*